United States Patent
Pehrsson et al.

(10) Patent No.: US 6,737,793 B2
(45) Date of Patent: May 18, 2004

(54) APPARATUS FOR EMITTING ELECTRONS COMPRISING A SUBSURFACE EMITTER STRUCTURE

(75) Inventors: Pehr Pehrsson, Fairfax Station, VA (US); James Butler, Huntingtown, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/378,650

(22) Filed: Mar. 5, 2003

(65) Prior Publication Data

US 2003/0155851 A1 Aug. 21, 2003

Related U.S. Application Data

(62) Division of application No. 09/917,663, filed on Jul. 31, 2001, now Pat. No. 6,554,673.

(51) Int. Cl.[7] .............................. H01J 1/02; H01J 1/14
(52) U.S. Cl. ...................... 313/311; 313/310; 313/309; 313/346 R; 313/326; 438/20
(58) Field of Search .................................. 313/309, 310, 313/311, 326, 346 R; 438/30, 20; 445/49, 50, 51

(56) References Cited

U.S. PATENT DOCUMENTS

| | | | |
|---|---|---|---|
| 5,129,850 A | | 7/1992 | Kane et al. |
| 5,141,460 A | | 8/1992 | Jaskie et al. |
| 5,202,571 A | | 4/1993 | Hirabayashi et al. |
| 5,258,685 A | | 11/1993 | Jaskie et al. |
| 5,458,518 A | * | 10/1995 | Lee ............................. 445/50 |
| 5,628,659 A | * | 5/1997 | Xie et al. ..................... 445/50 |
| 5,637,539 A | * | 6/1997 | Hofmann et al. ............ 438/20 |
| 5,670,788 A | | 9/1997 | Geis |
| 5,757,344 A | | 5/1998 | Miyata et al. |

(List continued on next page.)

OTHER PUBLICATIONS

M.W. Geis et al., Diamond Emiters Fabriation and Theory, J. Vac. Sci. Technol. B 14(3), 1996, 0734–211X.
Toshimichi Ito et al., Highly Efficient Electron Emitting Diode Fabricated With Single–Crystalline Diamond, diamond and related materials, 9 (2000) 1561–1568.

(List continued on next page.)

*Primary Examiner*—Nimeshkumar D. Patel
*Assistant Examiner*—Mariceli Santiago
(74) *Attorney, Agent, or Firm*—John J Karasek; Stephen T. Hunnius

(57) ABSTRACT

An apparatus for emitting electrons is provided. The apparatus includes a subsurface emitter having a sharp tip, a substrate including a base, and electrical continuity between the tip, the base, and an external circuit. This emitter structure may be used to form individual emitters or arrays of emitters. Also provided is a method of making electron emitters which is comprised of implanting energetic ions into a diamond lattice to form cones or other continuous regions of damaged diamond. These regions are more electrically conducting than the surrounding diamond lattice, and have locally sharp tips at or near the point of entry of the ion into the diamond. The tips may then also be additionally coated with a layer of a wide band-gap semiconductor. An electrically conducting material may also be placed in proximity to the tips to generate an electric field sufficient to extract electrons from the conducting tips into either the region above the surface, or into the wide band-gap semiconductor layer in contact with the tips. Electrical contact is made to the electrically conducting damage tracks and the electrical circuit may be completed with an electrically conducting material on the surface of the wide band-gap semiconductor or diamond, or in the ambient above the surface of the emitter. The surface of the wideband gap semiconductor or diamond may be chemically modified to enhance the emission of electrons from the surface.

9 Claims, 4 Drawing Sheets

U.S. PATENT DOCUMENTS

| | | | |
|---|---|---|---|
| 5,798,604 | A | 8/1998 | Duboc, Jr. et al. |
| 5,801,477 | A * | 9/1998 | Macaulay .................. 313/309 |
| 5,857,882 | A | 1/1999 | Pam et al. |
| 5,945,778 | A | 8/1999 | Jaskie |
| 5,977,697 | A | 11/1999 | Jin et al. |
| 5,990,604 | A | 11/1999 | Geis et al. |
| 6,034,468 | A | 3/2000 | Wilshaw |
| 6,051,849 | A | 4/2000 | Davis et al. |
| 6,100,628 | A | 8/2000 | Coll et al. |
| 6,177,688 | B1 | 1/2001 | Linthicum et al. |
| 6,181,055 | B1 | 1/2001 | Patterson et al. |

OTHER PUBLICATIONS

Toshimichi Ito et al., Highly Efficient Electron Emission From Diode–Type Plane Emitters Using Chemical–Vapor Deposited Single–Crystalline Diamond, 0003–6951, 98, 73 (25) 3739.

M. Waiblinger et al., Electrically Conducting Ion Tracks in Diamond–Like Carbon Films for Field Emission, Appl. Phys. A 69, 239–240 (1999).

Shiow–Hwa Lin et al., Electron Beam Activated Diamond Switch Experiments, 0–8194–1100–0, 93.

R. P. Joshi et al., Studies of High Field Conduction in Diamond for Electron Beam Controlled Switching, J. Appl. Phys. 0021–8979, 92–224781.

R. P. Joshi et al., Studies of Electron–Beam Penetration and Free–Carrier Generation in Diamond Films, J. Appl. Phys. 0021–8979, 93, 74 (3), 1568.

Y. Aikawa et al., Photoconductive Properties of Polycrystalline Diamond Under High Electric Field Strength, Diamond and related materials 5 (1996) 737–740.

Hitoki Yoneda et al., Photoconductive Properties of Chemical Vapor Deposited Diamond Switch Under High Electric Field Strength, Appl. Phys. Lett. 0003–6951, 95, 66 (4).

Hitoki Yoneda et al., The Grain Size Dependence of the Mobility and Lifetime in Chemical Vapor Deposited Diamond Photoconductive Switches, J. Appl. Phys. 0021–8979, 98, 83 (3), 1730, 4.

L. A. Vermeulen et al., Ultrafast Photoconductive Response of Semiconducting Diamond, Solid State communications, vol. 38, 1223–1225.

P. K. Bharadwaj et al., High Voltage Optoelectronic Switching in Diamond, Appl. Phys. Lett. 0003–6951, 83, 140207, 03.

Parmjit S. Panchhi et al., Picosecond Optoelectronic Switching in Insulating Diamond, 0018–9197, 86–0100–0101.

Jeff F. Young et al., Subnanosecond Time–Resolved Photoconductive Response of Semiconducting Diamond, appl. Phys. Lett. 003–6951, 83, 050434.

J. Glinski et al., Spacel–Charge–Induced Optoelectronics Switching In IIA Diamond, Appl. Phys. Lett. 0003–6951, 84, 150260, 03.

* cited by examiner

APPARATUS FOR EMITTING ELECTRONS COMPRISING A SUBSURFACE EMITTER STRUCTURE

This is a divisional application of U.S. patent application Ser. No. 09/917,663, inventors Pehrsson et al., filed Jun. 31, 2001, now U.S. Pat. No. 6,554,673, the entirety of which is herein incorporated by reference.

BACKGROUND OF THE INVENTION

1. Field of the Invention

The present invention is related to the field of electron emitters and more particularly, relates to a method for making stable, electron emitters and devices therefrom in diamond using an ion implantation technique.

2. Background of the Invention

There has been a great deal of research with respect to the physics of, and improved methods for fabricating, stable, modulatable electron (field) emitters (a type of cathode) having high current densities. Electron emitters are commonly used in such devices as power switches, microwave amplifiers, traveling wave tubes and the like.

Electron emitters emit electrons from structures at their ends, commonly referred to as "tips." The "tips" of emitters have a very small radius of curvature i.e. the tips are very pointed. The application of relatively small voltages in close proximity to an emitter extracts disproportionately large electron flows from its tip because the small radius of curvature of a tip concentrates the electric field.

The electric field extracts electrons from the conduction band and/or the valence band and/or Fermi level of the emitter material.

Devices of this type using tips and gates are commonly referred to as Spindt cathodes. A Spindt cathode is usually comprised of a micron-size cone or other structure with a sharp tip at the apex that is centered in a small-diameter hole. The size of the cone or other structure can vary. Furthermore, the shape of the cone can vary, as long as the structure contains a sharp tip. The cone is usually electrically conducting. Typically there is an electrically conducting film at or near the top of the cathode, usually in the shape of an annulus centered around the tip. The electrically conducting film may be used to apply an electrical potential near the tip of the cone and is called a "gate". The tip of the cone typically lies in or below the plane of the "gate" and is centered in a hole in the gate. When the cone has a sharp tip, an applied voltage between the cone and the gate causes electrons to emit from the cone tip into the surrounding media (typically a vacuum) and to be collected by a third electrical conductor, the anode. The design of the Spindt cathode allows a small applied voltage between the gate and the tip over a sub-micron distance to extract a comparatively large amount of electrons. Spindt cathodes are typically fabricated in large arrays. Spindt cathodes are typically treated with a material having a low work function such as Cs. This treatment of the cathodes lowers the work function of the cathodes, thereby facilitating emission of the electrons.

Spindt cathodes often suffer tip instabilities. These instabilities are brought about by processes such as heating of the cathode, electromigration and ion sputtering from the gas phase. Ion sputtering occurs as the electrons ejected from the tip ionize background gas molecules near the tip. The ionized gas molecules are accelerated back towards the substrate containing the tip by the same electric field used to extract the electrons from the tip. The momentum damage from the ion colliding with the tip sputters and blunts the tip of each electron emitter. As the tip is blunted, the radius of curvature of the tip increases. This lowers the enhancement of the electric field at the tip. Furthermore, such processes change the surface composition of the tip by furthering undesirable processes at the tip such as oxidation. This can increase the work function of the tip and lower the electron emission for a given applied voltage.

Another problem inhibiting development of arrays of these devices is making uniform the voltage applied to, and current extracted from, the individual tips. These non-uniformity problems often occur because of variations in the morphology, form and structure of individual tips. These problems can also occur because of differences in the distance between the individual tips and their gates, and because of variations of the effective work function of the individual tips due to differences in surface chemistry. The results of this lack of uniformity among the individual tips within the array are most commonly: poor overall emission from the array, or emission of most of the current from only a small number of tips in the array. Emission from a small number of tips leaves the tips which are emitting most of the current prone to overheating and to catastrophic failure.

To address these problems, diamond has received much attention as an emitter surface because under some conditions diamond has negative electron affinity. Because of this negative electron affinity, the vacuum level falls below the conduction band minimum, and an electron in the conduction band encounters little or no energetic barrier to emission into the vacuum. However, for diamond to work here, the electrons must be transmitted thru the diamond. Further, in some applications the electrons must be able to move through the diamond lattice from the point of injection to the front surface of the lattice, and then cross the front surface/vacuum interface and exit the interface into the vacuum or be collected by a conducting film on the surface.

Because of these electron transport problems, it would be beneficial to minimize the thickness of the lattice through which the electrons move and to create a lattice (or material) which causes minimal or no energy loss to the electrons as they move through the lattice. Further, it is desirable to minimize the work function of the emitting surface, and to minimize any energy losses that occur at the surface during emission.

There have been attempts in the prior art to address some of the issues discussed above. Prior art patents of interest includes U.S. Pat. No. 5,990,604 to Geis et al.; U.S. Pat. No. 5,945,778 to Jaskie; U.S. Pat. No. 5,857,882 to Pam et al.; U.S. Pat. No. 5,757,344 to Miyata et al.; U.S. Pat. No. 5,670,788 to Geis; U.S. Pat. No. 5,258,685 to Jaskie et al.; U.S. Pat. No. 5,202,571 to Hirabayashi et al.; U.S. Pat. No. 5,141,460 to Jaskie et al.; and U.S. Pat. No. 5,129,850 to Kane et al.

The Geis et al. ('604) patent discloses a field emitter of wide-bandgap materials composed of a doped diamond film emitter formed by chemical vapor deposition combined with a metal compound through annealing, eching or ion bombardment. The Jaskie ('778) patent discloses an enhanced electron emitter composed of a diamond bond structure with an electrically active defect at the emission site which is said to act like a very thin election emitter with a very low work function and improved current characteristics. The Pam et al. patent discloses a method for the processing of materials for uniform field emission. The field emitters are composed of a polycrystalline film on a substrate formed by carbon ion implantation, annealing and then conditioning by scanning with an electrode. The Miyata et al. patent discloses a cold cathode emitter element composed of a diamond film emitter and a diamond insulating film. The Geis ('788) patent discloses a diamond cold cathode composed of a carbon ion implanted n-type conductivity diamond region and a doped homoepitaxial p-type conductivity diamond region with a junction between. The Jaskie et al. ('685) patent discloses a field emission electron source employing a diamond coating grown from carbon nucleation sites selectively disposed on a selectively shaped substrate. The Hirabayashi et al. patent discloses an electron emitting device with a diamond emitter layer formed on a semiconductor substrate. The Jaskie et al. ('460) patent discloses a method of making a field emission electron source employing a diamond coating. The diamond coated emitter is formed by ion implantation creating nucleation sites for diamond formation. The Kane et al. patent also discloses a method of making field emitters with a diamond coating disposed on a conductive or semiconductive material, wherein the field emitters are formed by ion implantation of carbon into a selectively shaped substrate to facilitate diamond formation, depositing the conductive layer, and then removing the substrate.

SUMMARY OF THE INVENTION

In accordance with the invention, a method for fabricating an electron emitter is provided. In one embodiment, the method comprises the steps of: implanting one or more ions into the surface of a diamond substrate including a diamond lattice including $sp^3$ bonded carbon so as to damage the diamond lattice and to change at least a portion of the $sp^3$ bonded carbon in the diamond lattice to a mixture of $sp^3$ bonded carbon and $sp^2$ bonded carbon, the damage to the diamond lattice material forming one or more emitter tips at or near the surface of the diamond lattice material tapering to a corresponding number of wider bases within the diamond lattice material; providing electrical contact to the base of the emitter tips; possibly growing one or more additional advantageous layers on the diamond substrate; and providing at least one gate on or under the surface of the diamond lattice or other additional advantageous layers.

Preferably, at least one gate is deposited or otherwise created on or below the surface of the protective layer.

Advantageously, at least one gate is deposited or otherwise created on or below the surface of the diamond substrate material before the protective layer is grown, or the gate can be subsurface.

Preferably, a mask having one or more holes therein is placed or formed over the surface of the diamond lattice material prior to implantation; and the mask may be removed after implantation.

Advantageously, the surface of the diamond substrate is terminated so as to lower the work function of the surface. Preferably, the surface is chemically modified with moieties containing one or more of the following: hydrogen, cesium, oxygen, fluorine, potassium, rubidium, lithium or any other alkali metal.

Preferably, at least a portion of carbon from the damaged area resulting from the implantation is electro chemically or otherwise etched out so as to leave a hollow mold formed from etched out portions of the damaged area, and the mold so formed is filled with a conductive filler material. Prior patents of interest include: U.S. Pat. No. 5,269,890 to Marchywka; U.S. Pat. No. 5,587,210 to Marchywka et al., U.S. Pat. No. 5,702,586 to Pehrsson et al.

Advantageously, the filler material comprises a metal, amorphous carbon, or silicon.

Preferably, the protective layer comprises a thin homoepitaxial layer.

In another embodiment, a conductive material is deposited or otherwise created on or under the thin protective layer so as to provide a gate structure. Advantageously, the conductive material is amorphous carbon.

In yet another embodiment, the method comprises the steps of: implanting one or more ions into the surface of a doped diamond substrate including a diamond lattice including $sp^3$ bonded carbon, so as to damage the diamond lattice and to change at least a portion of the $sp^3$ bonded carbon in the diamond lattice to a mixture of $sp^3$ bonded carbon and $sp^2$ bonded carbon, the damage to the diamond lattice material forming one or more tips at or near the surface of the diamond lattice material tapering outwardly to a continuous, electrically conducting base within the diamond lattice material; providing an electrical contact to the implanted region; and if necessary, providing a diamond layer or layers on the diamond substrate; and providing at least one gate.

Preferably, the diamond substrate is doped with nitrogen.

Advantageously, the upper protective layer can be doped with boron.

Advantageously, the thin protective layer or layers are comprised of one or more homoepitaxial diamond layers, either doped or undoped.

In a further embodiment, the method comprises the steps of: implanting one or more ions into the surface of a diamond substrate including a diamond lattice including $sp^3$ carbon, so as to damage the diamond lattice and to change at least a portion the $sp^3$ bonded carbon in the diamond lattice to a mixture of $sp^3$ bonded carbon and $sp^2$ bonded carbon, the damage to the diamond lattice material forming one or more implantation areas at or near the surface of the diamond lattice material tapering outwardly to a single base within the diamond lattice material; providing an electrical contact to the implanted regions; possibly providing an additional diamond layer or layers on the diamond substrate; implanting one or more ions into the surface of the diamond layer including a diamond lattice including $sp^3$ bonded carbon so as to damage the diamond lattice and to change at least a portion of the $sp^3$ bonded carbon in the diamond lattice to a mixture of $sp^3$ bonded carbon and $sp^2$ bonded carbon, the damage to the diamond lattice material forming one or more tips at or near the surface of the diamond lattice material tapering to a corresponding plurality of wider bases within the diamond lattice material, wherein the plurality of wider bases are in conductive contact with the continuous, electrically conducting base within the diamond substrate; possibly growing a thin protective layer on the diamond layer; providing at least one gate; and providing at least one electrical contact to the implanted regions, and extending from the conductive base layer.

Advantageously, a mask is used over at least a portion of the surface of the diamond layer before implantation.

The arrays of electron emitters fabricated from the method of the invention are stable, modulatable, and have a high current density. The devices can operate in either a continuous (DC) or a pulsed mode. Further, the field emitting arrays can be fabricated using a group of standard techniques such as lithography, implantation, patterning and etching.

Other features and advantages of the invention will be set forth in, or will be apparent from, the detailed description of preferred embodiments which follows.

Advantageously, conductive or metallic material is deposited or otherwise created on or under the surface of the diamond or any of its protective layers. The resulting structure acts as an anode for the capture of electrons emitted from the tips. Its performance in this regard may be enhanced by applying a positive voltage with respect to the tip(s) or gate(s).

DESCRIPTION OF THE PREFERRED EMBODIMENTS

Several preferred embodiments of the method of the invention will be discussed with reference to the drawings.

Figure 1D:
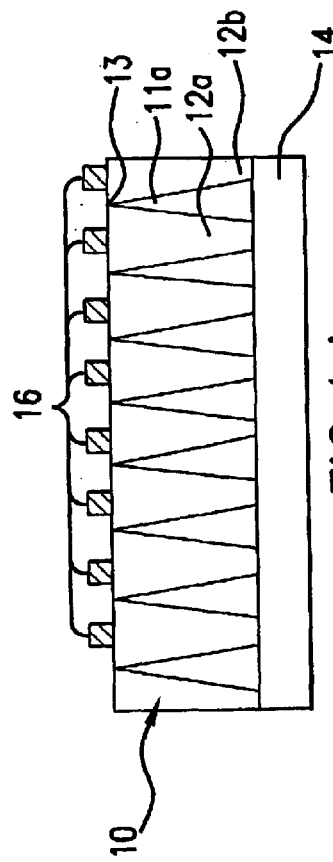
FIG. 1d is a schematic side elevational view of the substrate of FIG. 1a illustrating yet another step of the method.
Figure 1E:
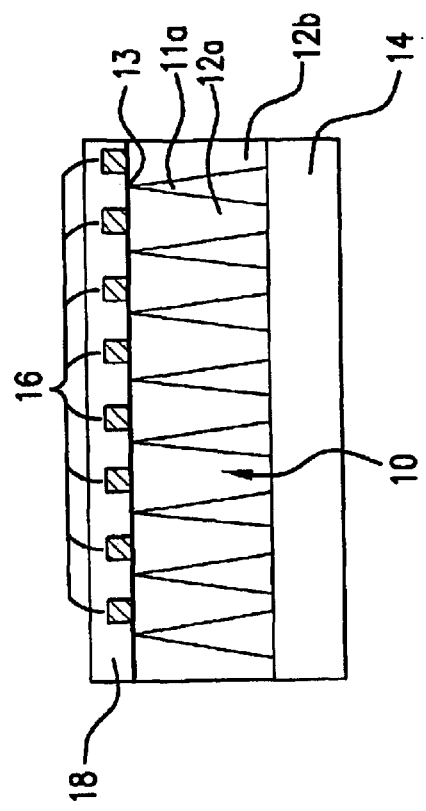
FIG. 1e is a schematic side elevational view of the finished product resulting from the steps of the method.
Figure 1A:
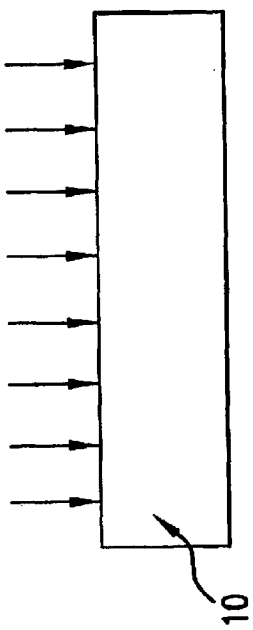
FIG. 1a is a schematic side elevational view of a substrate illustrating one step in a preferred embodiment of the method of the invention.

Referring to FIG. 1a, a diamond substrate 10 having a diamond lattice is shown. The diamond lattice within the material is comprised of a lattice of $sp^3$ bonded carbon atoms. As indicated by the arrows in FIG. 1a, a quantity of carbon or other ions are implanted into the diamond lattice material, as depicted by the arrows immediately above the diamond lattice substrate 10. The quantity of ions are implanted into the diamond substrate 10 at a rate of speed sufficient to pass into part or all of the diamond lattice. The ions are implanted into the diamond substrate 10 so as to selectively damage specific volumes of the diamond lattice. The diamond lattice within the diamond material 10 is converted to a mixture of $sp^2$ and $sp^3$ or pure sp2 carbon by the ions passing through the diamond material 10.

Figure 1B:
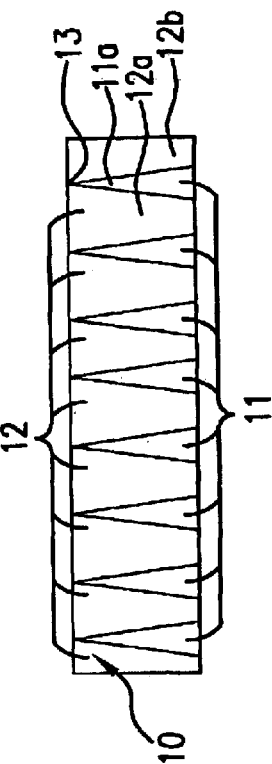
FIG. 1b is a schematic side elevational view of the substrate of FIG. 1a, illustrating a further step of the method.

Turning to FIG. 1b, the diamond lattice substrate 10 is shown as having a damaged portion 11 caused by the ion implant operation and an undamaged portion 12. Little energy is deposited into the lattice near the surface during the ion implant and because of the small amount of energy deposited at the surface of the diamond material 10, most of the damage is concentrated at the lower end of the damaged portion 11 below the surface. In this regard, as illustrated, the area of damage of the damaged portion 11 is generally conical and tapers to a point at or near the surface of the diamond substrate 10. This damage pattern results in high conductance regions with a broad base and comparatively narrow sharp tips at the surface of the diamond material 10. The base of the damaged portion 11 can be laterally continuous (i.e., with the bases of adjacent cones joined together) depending on the nature of the conductive area being fabricated.

In FIG. 1b, the damaged portion 11 is in the form of a group of individual cones, with a representative cone being denoted 11a. As illustrated, cone 11a extends downwardly from a point of impact at or near the surface to a wider base within the substrate material. Similarly, in FIG. 1b, the undamaged portion 12 separates the individual cones of the damaged area 11 from each other so that, as viewed in cross section, portions of the undamaged portion 12, denoted 12a and 12b, isolate cone 11a between them. The damage to the lattice from the ion implantation results in changes to some of the bonds between the carbon atoms of the lattice in the damaged portion 11. More specifically, the $sp^3$ bonds between the carbon atoms are converted by the damage to the lattice to a mixture of $sp^2$ and $sp^3$ bonds. Because of the changes in bond structure, the damaged portion 11 is more electrically conductive than the undamaged and unchanged portion 12 of the diamond substrate 10.

Sharp emitter tips are created at the tips of the cones of the damaged portion 11, with a representative tip at the top of cone 11a being denoted 13. The tips may be so small as to be atomically sharp. The sharpness and higher conductivity of cone 11a enable the cone to function effectively as a field emitter.

The distribution of the damage to the diamond substrate 10 and, hence, the shape of the damaged area 11, can be adjusted by changes in implantation energy, angle of implantation and ion mass of the implantation ions. The locations of the emitters relative to each other can be controlled by controlling the location of the points of ion implant at the surface of the substrate 10.

For example, the locations of the points of ion impact on the surface of the diamond substrate 10 can be adjusted by use of a mask (not shown). By varying the energy of the implanted ions, the borders of the damage can be adjusted so that the damage begins precisely at the surface of the diamond material 10. Because of this ability to control the location of the damage area 11, all of the tips of the cones of the damaged area 11 created by the ion implant operation can be made to be coplanar to the extent permitted by the smoothness of the starting surface. If desired, the energy can be adjusted such that the damage begins away from the starting surface.

Damage to the tip 13 at or near the beginning of the ion implant region may be discontinuous or conduct insufficiently for efficient electron conduction, and hence subsequent processing steps may be required. Poor electron conduction near the tip can be minimized or eliminated by use of the mask to implant multiple ions through small lithographically-created openings in the mask 10. The use of a mask helps ensure that the tip 13 is damaged from multiple ions such that there is ensured continuity of the damage and electrical contact near the surface to the emitter tips. The mask can be removed after the implantation is finished.

Figure 1C:
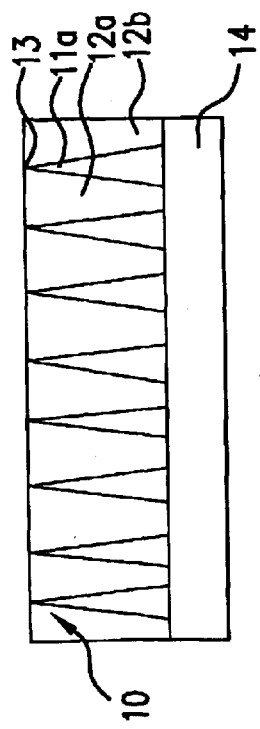
FIG. 1c is a schematic side elevational view of the substrate of FIG. 1a illustrating a further step of the method.

Turning to FIG. 1c, in the step illustrated, a contact 14 is added beneath the diamond material for providing connection of a voltage source or other electrical circuit to the bases of the emitter tips contained in the diamond substrate 10. The contact can also be made from the side or top of the diamond substrate, if necessary by opening a hole to the bases through any insulating diamond. The contact is typically comprised of a metal and the metal, or other suitable material of the back contact; may be selected to have a low work function. Referring to FIG. 1d in the illustrated step, a series of gates, denoted 16, are deposited on the surface of the diamond substrate 10. The gates 16 are used to turn the emitter array on and off. In this embodiment, the gates 16 are formed by depositing a metal or other conducting material on the surface of the diamond substrate 10. Alternatively, the gates can be created by an additional ion implantation step to form gates beneath the surface of the diamond, but still near or coplanar with the emitter tips.

Because of the planar alignment of the tips of the cones 11 of the damaged region with each other, the distances between the tips of the cones 11 and the gates 16 are uniform. The degree of uniformity is primarily a function of the smoothness of the starting surface of the diamond substrate 10.

Referring to FIG. 1e, layer 18 of homoepitaxial diamond is grown on the diamond substrate 10 as a next step. Layer 18 can be more than one layer and can consist of variously doper and/or undoped layers. This results in the thin protective diamond layer 18 overlying a set of coplanar points at a highly uniform distance from the lower surface of the thin diamond layer 18. Layer 18 protects the emitter tips from oxidation and backsputtering, while providing a low energy pathway for electrons to reach the surface/vacuum or surface/anode interface at the surface of the layer 18. If the implantation energy was sufficiently high, the emitter tips are subsurface even without the growth of a further layer, and thus also have a protective diamond layer over them.

Figure 1F:
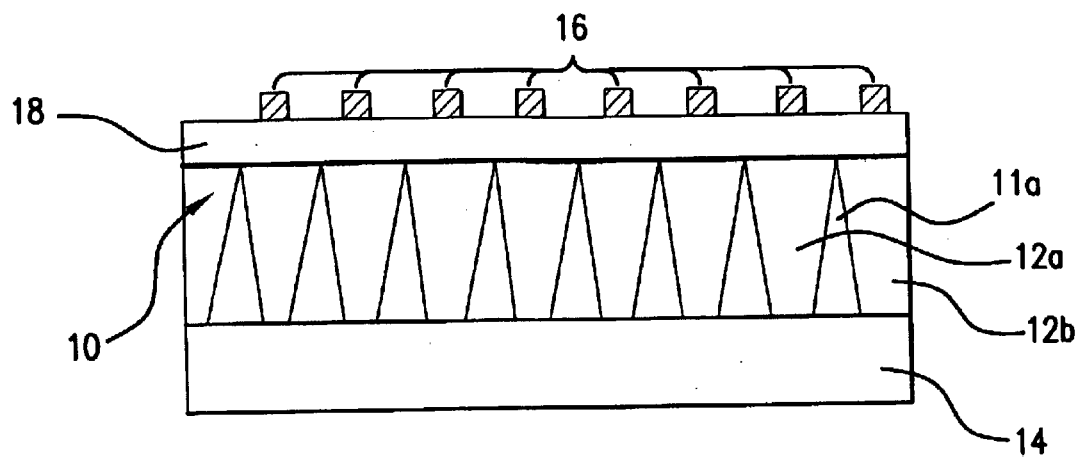
FIG. 1f is a schematic side elevational view of a further finished product resulting from the steps of an alternative embodiment of the method.

In an alternative embodiment shown in FIG. 1f, the metal gates 16 are deposited after growth of the homoepitaxial layer 18 onto the layer 18 itself.

Figure 1G:
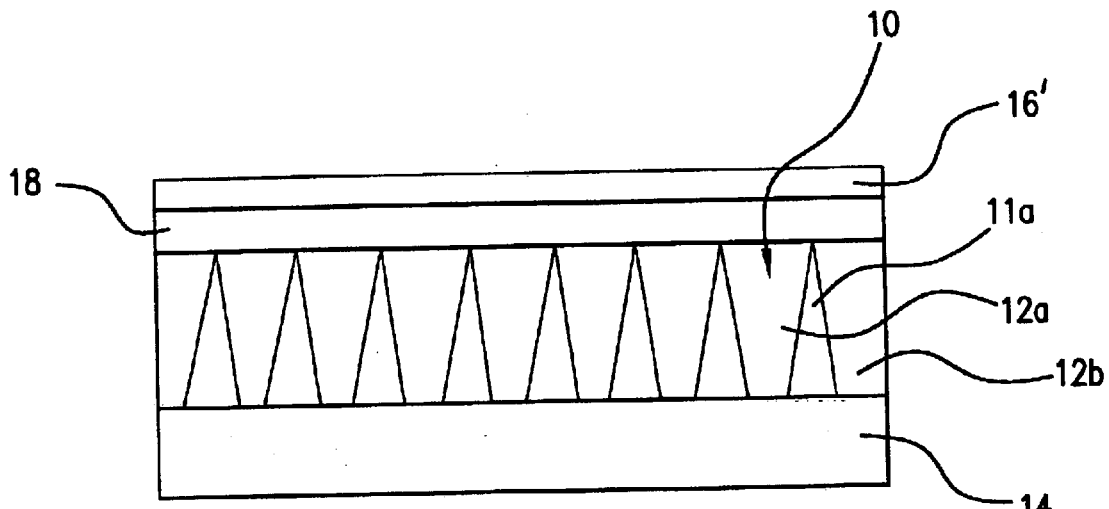
FIG. 1g is a schematic side elevational view of a finished product having an alternative gate structure.

In yet another embodiment, shown in FIG. 1g, an alternative gate structure 16' is fabricated by the deposition of a continuous layer of a conductive material onto the diamond layer 18. In this embodiment, the gate material is typically not a metal, but rather another conductive material, such as amorphous carbon, through which electrons will pass. Alternatively, the resultant array may have no gates or gate layer, as such, but rather use an anode (not shown) positioned on or above the diamond surface to fulfill the function of the gate. Alternatively, the resultant array may have gates or a gate layer below the surface, with an anode (not shown) positioned on or above the diamond surface to collect the emitted electrons.

Figure 1H:
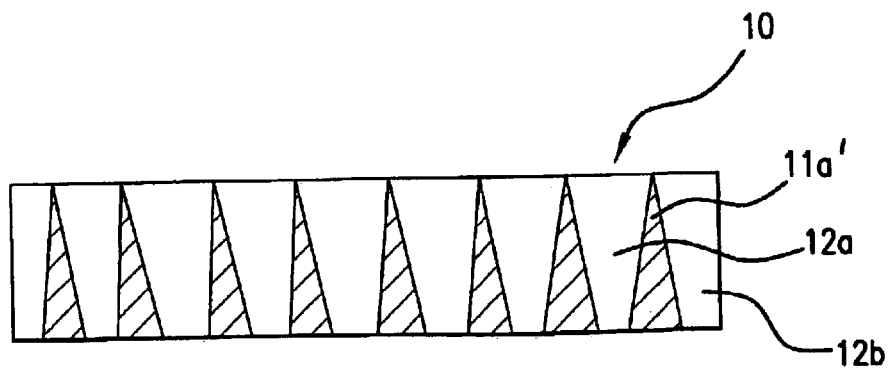
FIG. 1h is a schematic side elevational view of a substrate produced during an alternative embodiment of one step of the method of the invention.

Referring to FIG. 1h, another embodiment is shown wherein an electrochemical etch or other type of etch is used to etch out the carbon in the damaged areas 11. The etching leaves a mold recess 11a corresponding to the removed cone 11a'. The mold from the etching is filled with metal, Si, or other suitable material. This process results in an-emitter array with a very clean material/diamond interface at the emitter tip. Electrical contact to the emitters is made in the ways described above.

The emitter array of the invention allows electrons to move through the diamond lattice, from the tip 13, and to transit a diamond/vacuum or diamond/anode or protective layer/anode interface at the surface of the diamond substrate 10 with little or no energy loss. It has been found that diamond may exhibit ballistic electron transport through the lattice. This is especially true for electron transport over short (sub-micron) distances and for single crystal diamonds. An electron in the conduction band of properly-terminated diamond may encounter little or no energy barrier to prevent emission thereof into the vacuum.

In an additional alternative step, some or all of the diamond surfaces involved in fabrication of the emitter array are chemically modified by a hydrogenation or cesiation or other process. This chemical modification or surface termination can be carried out with or without prior oxidation of the surface. Properly terminated diamond surfaces exhibit low work functions, and a high secondary electron emission coefficient which are both advantageous in a field emitter array.

Figure 2A:
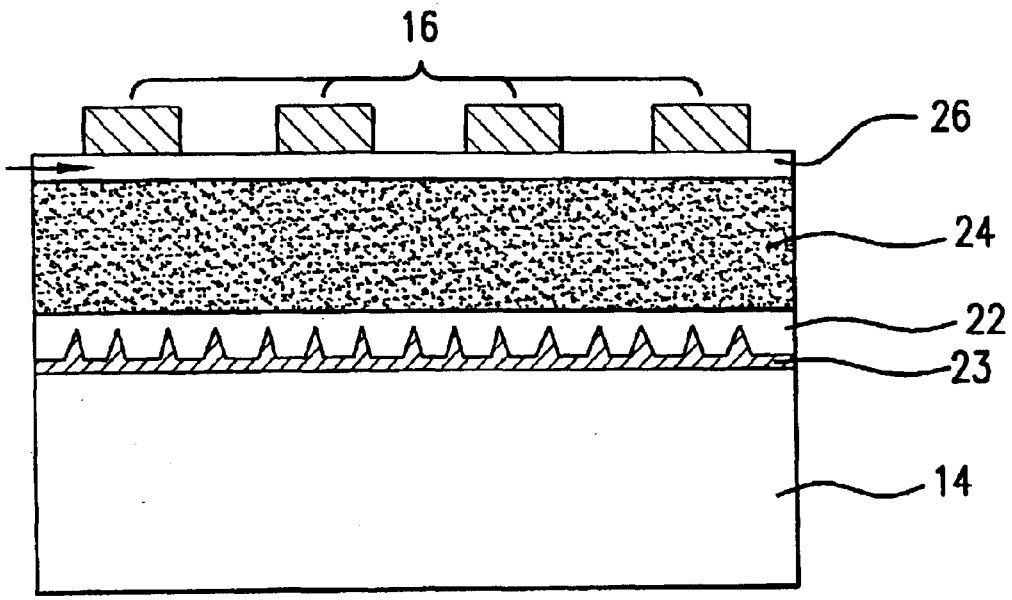
FIG. 2 is a schematic side elevational view of a finished product resulting from yet another embodiment of the method of the invention.
Figure 2B:
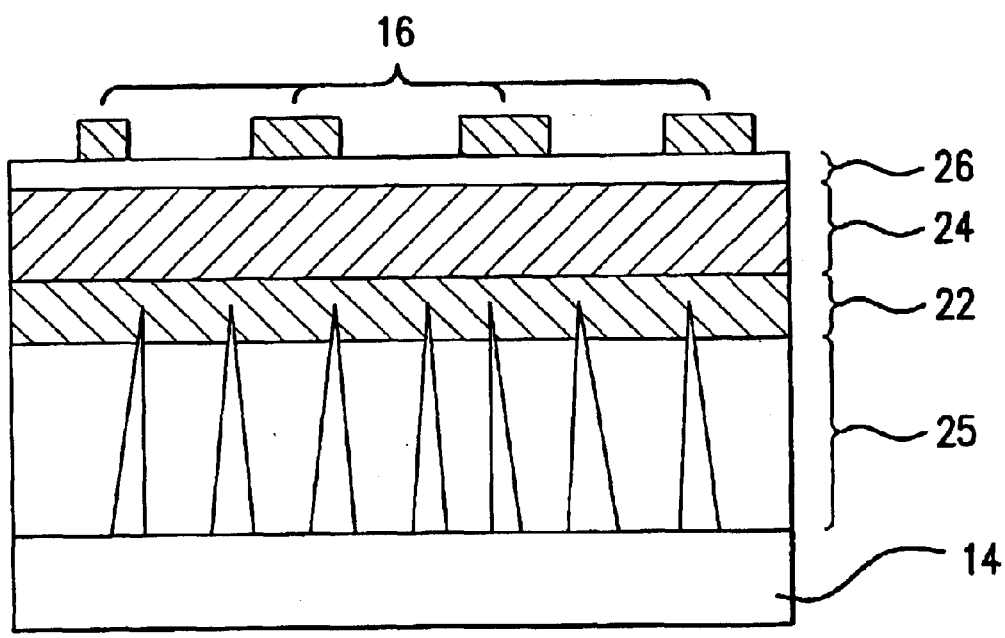

Turning to FIG. 2a, another embodiment of the invention using doped diamond layers is shown. In this embodiment, doping is used to assist the electron emission and transport process and in particular, a layer 22 of N-doped diamond material is provided. This layer is typically 1 nm or more thick. The layer 22 can be modified by (multiple) ion implantation(s) to create a region 23 with cone shaped patterns with emitter tips and a continuous electrically conducting damage region. A continuous electrically conducting pathway exists between the emitter tip(s) and the electrically conducting layer. At least one electrical connection between the continuous conducting layer and the emitter tips is provided. Electron injection and transport are assisted by doping the diamond layer 22 into which the ions are implanted, or by implanting into an undoped diamond substrate at low enough energy so as to create the emitter tips at or near the diamond surface, followed by growth of a N-doped diamond layer immediately on top of the undoped diamond. This results in a steep, but very narrow and downward band bending region through which the electrons can tunnel into the conduction band of diamond or to the surface. Turning to FIG. 2b, a layer of undoped diamond 25 may be below the emitter tips provided there is a continuous, electrically conducting pathway from the contact to the implanted region. For example, such might be accomplished by implantation at sufficient implantation energies that the ions pass through the N-doped layer and into the undoped material underneath.

In addition, a layer 24 of undoped diamond material can be deposited on the n-doped diamond layer 22. The undoped layer 24 minimizes carrier scattering while protecting the emitter tips.

Further, a layer 26 of B-doped diamond material can be deposited on the surface of the undoped diamond layer 24. The B-doped layer 26 is grown to maximize emission of both primary and secondary electrons from the surface by altering the band-bending. The B-doped layer 26 also provides a pathway for electron replenishment through lateral electron movement on the surface thereof. Accordingly, the electron injection and transport processes are further assisted by the B-doped diamond layer 26.

Figure 3D:
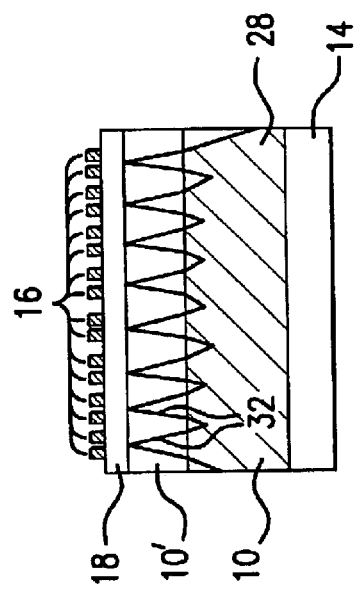
FIG. 3d is a schematic side elevational view of the substrate of FIG. 3a illustrating a further step of the method.
Figure 3E:
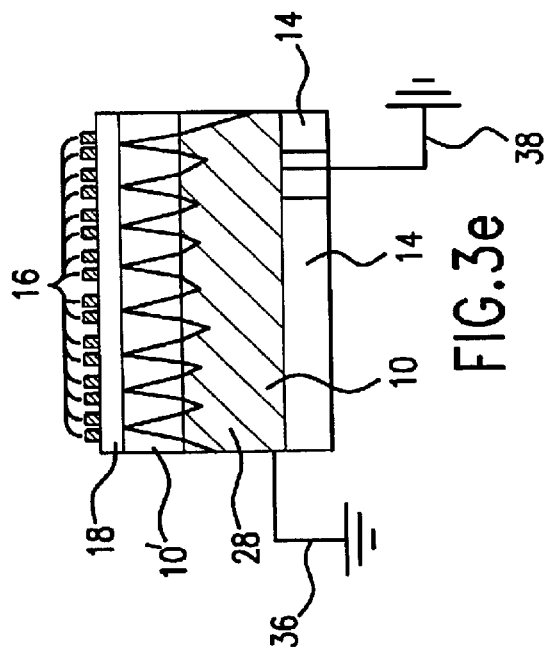
FIG. 3e is a schematic side elevational view of a finished product resulting from the steps of the further preferred embodiment of the method of the invention.
Figure 3A:
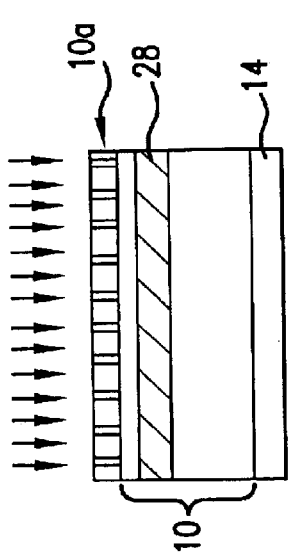
FIG. 3a is a schematic side elevational view of a substrate illustrating one step in a further preferred embodiment of the method of the invention.

Turning to FIGS. 3a–3d, a further embodiment of the invention is illustrated. In FIG. 3a, implantation is used to create a buried, continuous conducting layer in a diamond substrate 10. The substrate 10 is damaged by implantation as discussed in connection with previous embodiments to create a subsurface damage area 28. A photoresist 10a can be used during implantation to define the emitter tips. If the photoresist is used, the photoresist can be removed after implantation. The implantations result in a buried continuous damage layer 28, rather than a damage area of isolated cones with tips as in previous embodiments. As illustrated, only the areas of initial impact are separate from each other. As in previous embodiments, contact 14 is made between the continuous conducting layer and the emitter tips.

Figure 3B:
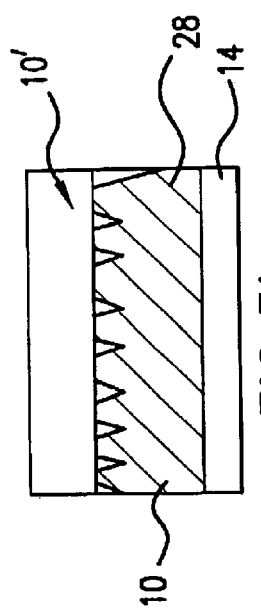
FIG. 3b is a schematic side elevational view of the substrate of FIG. 3a illustrating a further step of the method.

In the next step, shown in FIG. 3b, a homoepitaxial layer 10' can be deposited on the surface of the diamond substrate 10 containing the subsurface damage area 28.

Figure 3C:
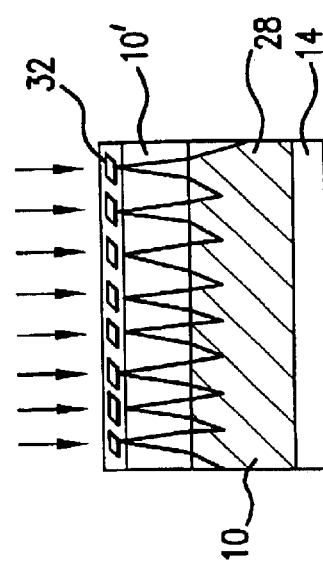
FIG. 3c is a schematic side elevational view of the substrate of FIG. 3a illustrating another step of the method.

As shown in FIG. 3c, a mask 32 consisting of photoresist, metal, other material or combinations thereof may be placed on the surface of the homoepitaxial layer 10'. Ion implantation is carried out and a damage area comprising a series of cones 32 with sharp tips formed in the diamond layer 10' generally as shown in FIG. 1b. Implantation is carried out with a low flux of higher energy ions so as to create isolated tips in contact with the continuous damage layer. If a mask is used, the mask can be removed after implantation.

In the next step, illustrated in FIG. 3d, a homoepitaxial layer 18 can be grown over the homoepitaxial layer 10'. Gates 16 are deposited on or under the surface of the layer 18.

Referring to FIG. 3e, at least one electrical connection between the continuous conducting layer and the emitter tips is provided and in this embodiment, a side connection 36 and a bottom connection 38 are shown. Connections can be made on the side or via a hole on the top or bottom of the device, for example by removing the unimplanted diamond 14 to expose the underlying conductive layer. Alternatively, further implantation can be used to create a conductive path from the surface to the buried subsurface conducting layer and emitting tips.

Although the invention has been described above in relation to a preferred embodiment thereof, it will be readily understood by those skilled in the art that variations and modifications can be effected without departing from the scope and spirit of the invention.

What is claimed is:

1. An apparatus for emitting electrons, comprising:
    a substrate, wherein said substrate is selected from the group consisting of diamond, amorphous carbon, diamond-like carbon, silicon carbide, boron nitride, gallium nitride, and aluminum nitride and wherein said substrate includes a damaged area formed by ion implantation;
    a subsurface emitter having a sharp tip and a base within said substrate, said subsurface emitter formed by said ion implantation; and
    electrical continuity between said tip, said base, and an external circuit.

2. The apparatus as in claim 1, further comprising:
    a protective layer on said substrate.

3. The apparatus as in claim 2, wherein said protective layer is a homoepitaxial layer.

4. The apparatus as in claim 2, further comprising:
    at least one gate.

5. The apparatus as in claim 1, further comprising:
    a conductive filler material inside at least a portion of said damaged area.

6. The apparatus as in claim 5, wherein said conductive filler material is a metal.

7. The apparatus as in claim 6, wherein said conductive filler material is silicon.

8. The apparatus as in claim 6, wherein said conductive filler material is amorphous carbon.

9. The apparatus as in claim 1, wherein said substrate is electrically insulating.

* * * * *